United States Patent
Takizawa et al.

(10) Patent No.: US 8,139,375 B2
(45) Date of Patent: Mar. 20, 2012

(54) ELECTRONIC APPARATUS

(75) Inventors: Minoru Takizawa, Sagamihara (JP); Kiyokazu Ishizaki, Akishima (JP); Takahiro Sugai, Kokubunji (JP); Syuji Hiramoto, Kokubunji (JP); Koji Tada, Hamura (JP); Ichioh Murakami, Akishima (JP); Satoru Yasui, Kokubunji (JP); Masaru Harashima, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

(21) Appl. No.: 12/769,480

(22) Filed: Apr. 28, 2010

(65) Prior Publication Data

US 2011/0026230 A1 Feb. 3, 2011

(30) Foreign Application Priority Data

Jul. 30, 2009 (JP) ................... 2009-178226

(51) Int. Cl.
*H05K 7/02* (2006.01)
*H05K 7/04* (2006.01)

(52) U.S. Cl. ....................... 361/807; 361/810

(58) Field of Classification Search .......... 361/807, 361/810, 760, 741, 720, 748; 439/660, 60, 439/79, 80, 630, 637, 607.31–607.33
See application file for complete search history.

(56) References Cited

U.S. PATENT DOCUMENTS

| 5,944,536 | A  | * | 8/1999  | Seong et al. ............... 439/79 |
| 6,315,620 | B1 | * | 11/2001 | Moir et al. ............... 439/862 |
| 6,752,662 | B2 | * | 6/2004  | Okamoto ............ 439/607.04 |
| 7,217,159 | B2 | * | 5/2007  | Chung .............. 439/607.01 |
| 7,458,826 | B1 | * | 12/2008 | Maatta ................. 439/79 |
| 7,828,574 | B2 | * | 11/2010 | Zhu ..................... 439/328 |

FOREIGN PATENT DOCUMENTS

| JP | 01-97573    | 6/1989  |
| JP | UM 4-4778   | 1/1992  |
| JP | 05-23564    | 3/1993  |
| JP | 06-302627   | 10/1994 |
| JP | 2002-334953 | 10/1994 |
| JP | 2003-347685 | 12/2003 |

OTHER PUBLICATIONS

Japanese Patent Application No. 2009-178226; Final Notice of Rejection; Mailed Nov. 9, 2010 (English Translation).
Japanese Patent Application No. 2009-178226; Notice of Reasons for Rejection; Mailed Aug. 17, 2010 (English Translation).

* cited by examiner

*Primary Examiner* — Hung S Bui
(74) *Attorney, Agent, or Firm* — Blakely, Sokoloff, Taylor & Zafman LLP (57) ABSTRACT

According to one embodiment, an electronic apparatus includes a housing, a printed wiring board accommodated in the housing, and a circuit component electrically connected to the printed wiring board, the circuit component including an outer peripheral surface. The printed wiring board includes an outer peripheral edge, at least a pair of edge portions extending in mutually crossing directions, the pair of edge portions being opposed to the outer peripheral surface of the circuit component and being located inside the outer peripheral edge, and a projection portion located between the pair of edge portions and projecting toward the circuit component.

7 Claims, 8 Drawing Sheets

ELECTRONIC APPARATUS

CROSS-REFERENCE TO RELATED APPLICATIONS

This application is based upon and claims the benefit of priority from Japanese Patent Application No. 2009-178226, filed Jul. 30, 2009, the entire contents of which are incorporated herein by reference.

BACKGROUND

1. Field

One embodiment of the present invention relates to an electronic apparatus, for example, including a printed wiring board on which a circuit component, such as a connector, is mounted.

2. Description of the Related Art

A printed wiring board, on which a circuit component such as an LSI or a USB connector is mounted, is accommodated in an electronic apparatus such as a portable computer. In an electronic apparatus with small thickness, which is disclosed in Jpn. UM Appln. KOKAI Publication No. H1-97573, a hole is formed in a printed wiring board, and a circuit component is accommodated in the hole.

As an example of the printed wiring board having the above-described structure, there is known a printed wiring board with a cut part which is so cut as to open to an outer peripheral edge thereof. The cut part is provided with first and second edge portions which are mutually opposed, and a third edge portion which spans between the first and second edge portions. A circuit component, such as a USB connector or an RGB connector, is put in the region surrounded by the first to third edge portions, and the circuit component is soldered to the printed wiring board.

The cut part is formed in the printed wiring board by a cutting process using a router. The router moves along the first to third edge portions of the cut part. Thereby, the printed wiring board is cut, and the cut part is formed.

In the printed wiring board with the cut part, a stress tends to concentrate at a corner portion which is defined by the first and third edge portions of the cut part and at a corner portion which is defined by the second and third edge portions. Thus, if a plug is inserted/removed in/from the connector which is mounted in the cut part, or if the electronic apparatus receives a shock, a large stress inevitably occurs at the corner portions of the cut part. Consequently, such fault arise that conductor patterns on the printed wiring board are broken, and defects occur at the soldered parts of circuit components.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic apparatus includes a housing, a printed wiring board accommodated in the housing, and a circuit component electrically connected to the printed wiring board, the circuit component including an outer peripheral surface. The printed wiring board includes an outer peripheral edge, at least a pair of edge portions extending in mutually crossing directions, the pair of edge portions being opposed to the outer peripheral surface of the circuit component and being located inside the outer peripheral edge, and a projection portion located between the pair of edge portions and projecting toward the circuit component.

A first embodiment of the present invention will now be described with reference to FIG. 1 to FIG. 5.

Figure 1:
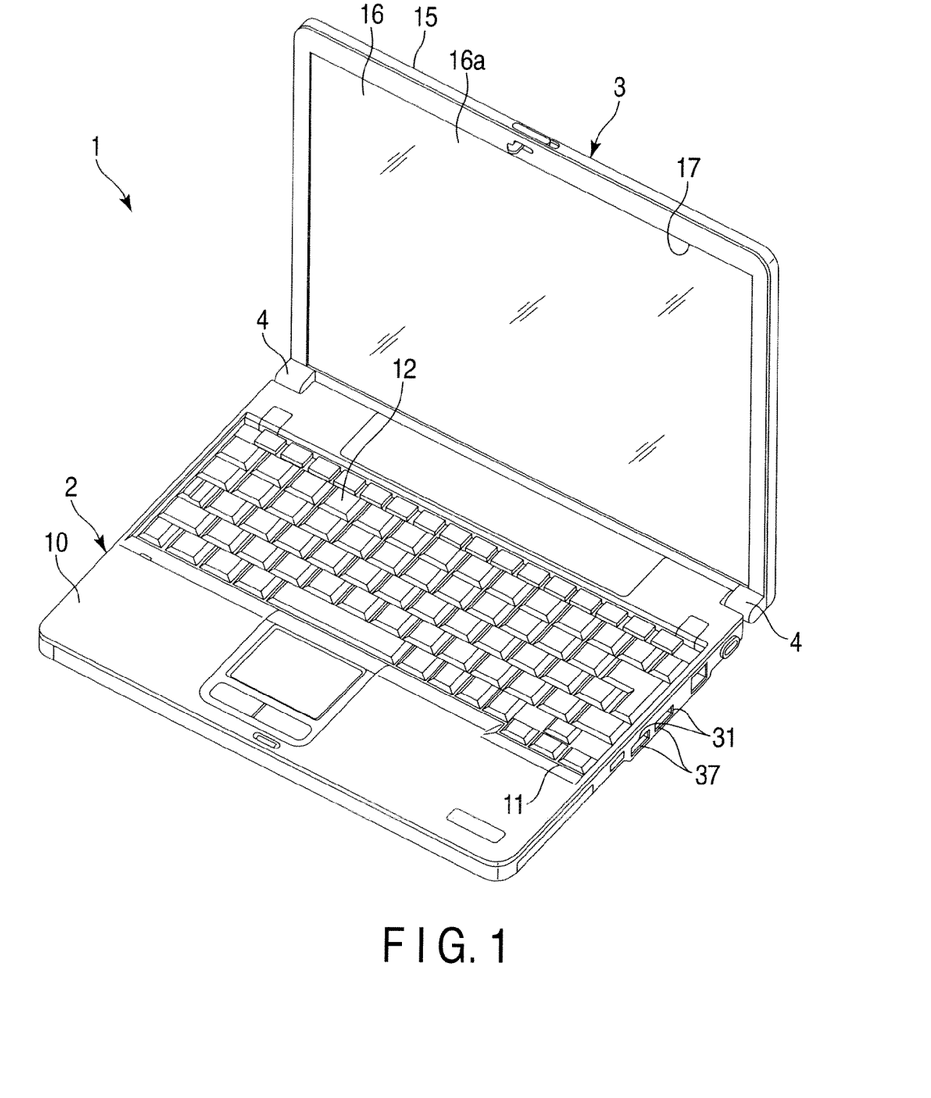
FIG. 1 is an exemplary perspective view of a portable computer according to a first embodiment of the present invention.

FIG. 1 shows a portable computer 1, which is an example of an electronic apparatus. The portable computer 1 comprises a computer main body 2 and a display module 3.

The display module 3 is coupled to a rear end of the computer main body 3 via a pair of hinge portions 4. The display module 3 is rotatable, with the hinge portions 4 functioning as fulcrum, between a closed position where the display module 3 is laid over the computer main body 2, and an open position where the display module 3 stands from the rear end of the computer main body 2.

The computer main body 2 has a flat box-shaped housing 10. A keyboard attachment portion 11 is formed on the upper surface of the housing 10. A keyboard 12 is supported on the keyboard attachment portion 11.

The display module 3 comprises a flat box-shaped display housing 15, and a liquid crystal display panel 16 which is accommodated in the display housing 15. The liquid crystal display panel 16 has a screen 16a. The screen 16a is exposed to the outside of the display module 3 through an opening portion 17 which is made in the front surface of the display housing 15.

FIG. 2 to FIG. 5 show a part of a circuit module 20 which is accommodated within the housing 10. The circuit module 20 comprises a USB connector 22, a printed wiring board 24, and other electronic components 26 such as capacitors and resistors. The USB connector 22 is an example of the circuit components.

Figure 2:
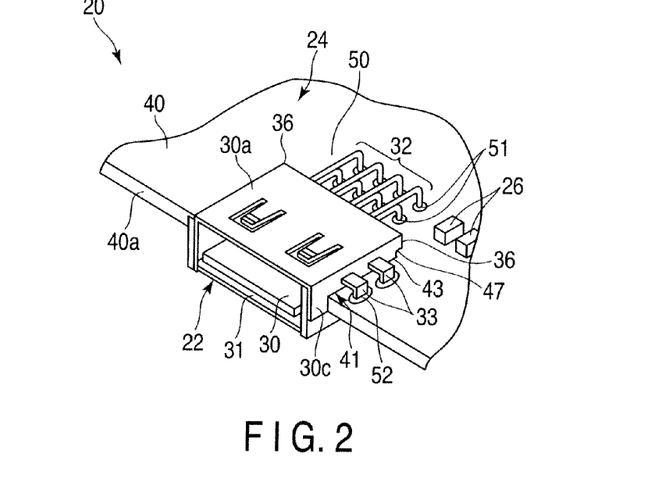
FIG. 2 is an exemplary perspective view showing a part of a circuit module according to the first embodiment of the invention.
Figure 3:
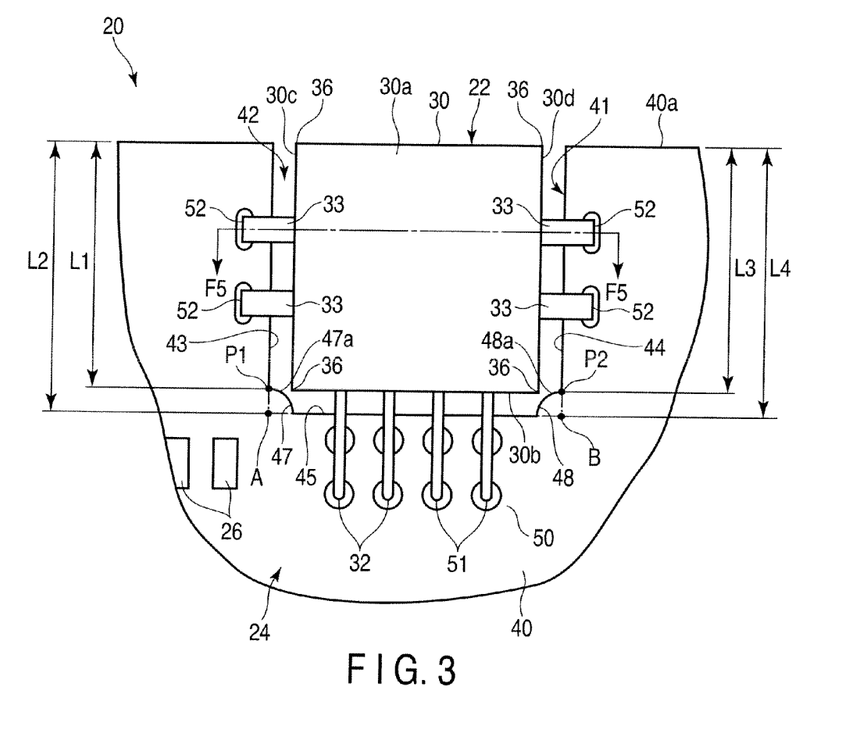
FIG. 3 is an exemplary plan view showing a part of the circuit module according to the first embodiment of the invention.

The USB connector 22 comprises a connector body 30, an insertion port 31 in which a plug of a USB device (not shown) is detachably inserted, a plurality of pin terminals 32, and a plurality of reinforcement pins 33.

As shown in FIG. 2 and FIG. 3, the connector body 30 has a flat box shape with an upper surface 30a, a rear surface 30b, and side surfaces 30c and 30d. The rear surface 30b and side surfaces 30c and 30d are examples of side edges.

The rear surface 30b and side surfaces 30c and 30d are outer peripheral surfaces of the USB connector 22. The connector body 30 has four right-angled corner portions 36. These corner portions 36 are located on the outer peripheral surfaces of the USB connector 22.

The insertion port 31 is open at an end portion of the connector body 30, which is opposite to the rear surface 30b of the connector body 30. The insertion port 31 is exposed to the outside of the housing 10 via a USB opening portion 37 which is provided in the housing 10.

The pin terminals 32 project outward of the connector body 30 from the rear surface 30b of the connector body 30. The reinforcement pins 33 project outward of the connector body 30 from the side surfaces 30c and 30d of the connector body 30.

The printed wiring board 24 comprises a rectangular board 40. The board 40 is configured such that insulation layers and conductor layers are alternately stacked and pressed. As shown in FIG. 2 to FIG. 5, the board 40 is provided with a cut part 41.

The cut part 41 is formed by cutting the board 40. The cut part 41 is a recess portion which is so cut as to open to an outer peripheral edge 40a of the board 40. The USB connector 22 is disposed inside the cut part 41.

The cut part 41 is provided with first to third edge portions 43, 44 and 45. The first and second edge portions 43 and 44 are disposed in parallel and opposed to the side surfaces 30c and 30d of the USB connector 22.

The third edge portion 45 spans between the first and second edge portions 43 and 44, and is set back from the outer peripheral edge 40a of the board 40. The third edge portion 45 is opposed to the rear surface 30b of the USB connector 22.

The first to third edge portions 43, 44 and 45 are located inside the outer peripheral edge 40a. In the meantime, the first and second edge portions 43 and 44 may be disposed in such a tapering shape as to gradually increase the distance therebetween toward the outer peripheral edge 40a of the board 40.

Figure 4:
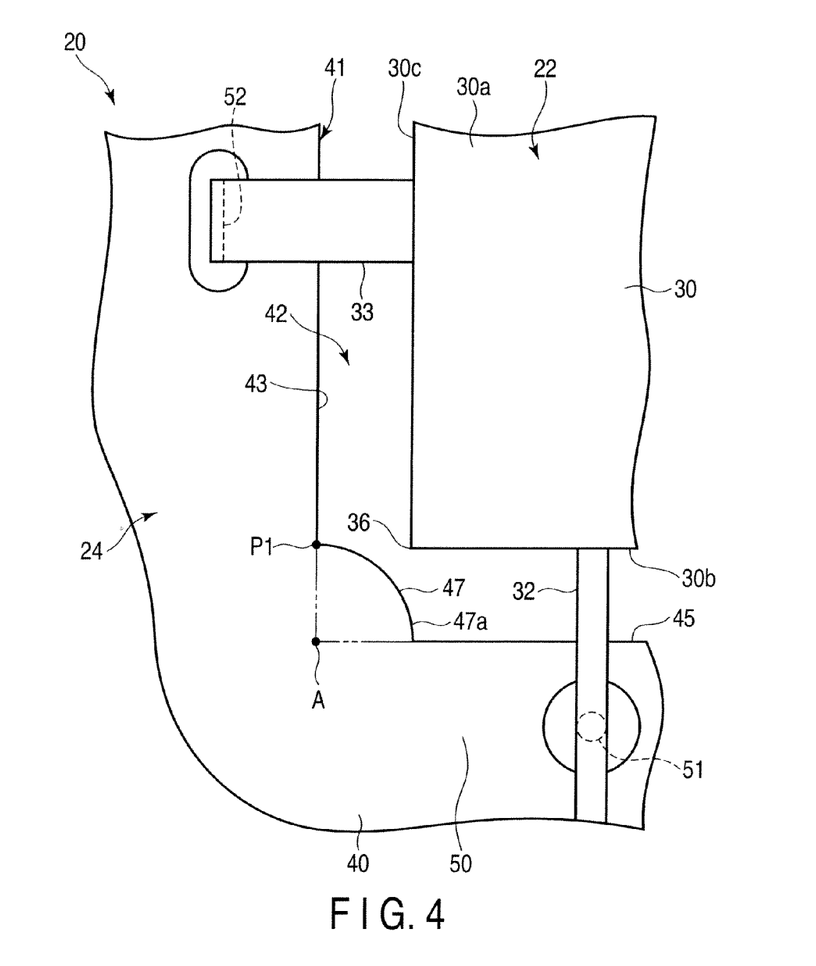
FIG. 4 is an exemplary plan view showing, in enlarged scale, a part of FIG. 3.
Figure 5:
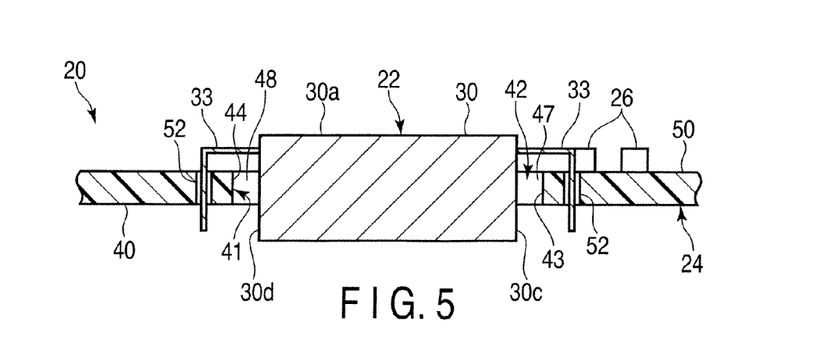
FIG. 5 is an exemplary cross-sectional view taken along line F5-F5 in FIG. 3.

If the first edge portion 43 and third edge portion 45 are extended, the first and third edge portions 43 and 45 intersect at an intersection point A in FIG. 3 and FIG. 4. Similarly, if the second edge portion 44 and third edge portion 45 are extended, the second and third edge portions 44 and 45 intersect at an intersection point B in FIG. 3.

The intersection point A and intersection point B correspond to the two corner portions 36 of the USB connector 22. The rear surface 30b and side surfaces 30c and 30d of the USB connector 22 are spaced apart, with a gap 42, from the first to third edge portions 43, 44 and 45 of the cut part 41.

As shown in FIG. 3, the board 40 includes projection portions 47 and 48 which project from the intersection points A and B toward the corresponding corner portions 36 of the USB connector 22. The projection portion 47 is formed to span between one end of the first edge portion 43 and one end of the third edge portion 45. In other words, the projection portion 47 is located between the first edge portion 43 and third edge portion 45. The projection portion 47 has a peripheral edge portion 47a which protrudes to the gap 42 and curves in an arc about the intersection point A.

Similarly, the projection portion 48 is formed to span between one end of the second edge portion 44 and the other end of the third edge portion 45. In other words, the projection portion 48 is located between the second edge portion 44 and third edge portion 45. The projection portion 48 has a peripheral edge portion 48a which protrudes to the gap 42 and curves in an arc about the intersection point B.

The board 40 has a mounting surface 50. The mounting surface 50 is continuous with the first to third edge portions 43, 44 and 45 of the cut part 41. The mounting surface 50 has a plurality of through-holes 51 and a plurality of insertion holes 52, which are provided around the cut part 41. Other electronic components 26 are mounted by soldering to the mounting surface 50.

The plural through-holes 51 are provided in a region that is adjacent to the rear surface 30b of the USB connector 22. The pin terminals 32 of the USB connector 22 are inserted in the through-holes 51 and fixed by soldering. Thereby, the USB connector 22 is electrically connected to the printed wiring board 24.

The plural insertion holes 52 are provided in regions that are adjacent to the side surfaces 30c and 30d of the USB connector 22. The reinforcement pins 33 of the USB connector 22 are inserted and fixed in the insertion holes 52.

As shown in FIG. 3, the length L1 between the outer peripheral edge 40a of the board 40 and the projection portion 47 is less than the length L2 between the outer peripheral edge 40a of the board 40 and the intersection point A. Similarly, the length L3 between the outer peripheral edge 40a of the board 40 and the projection portion 48 is less than the length L4 between the outer peripheral edge 40a of the board 40 and the intersection point B.

When a stress acts on the board 40, the stress concentrates at a point P1 which is defined by the first edge portion 43 and the projection portion 47, and at a point P2 which is defined by the second edge portion 44 and the projection portion 48. The strain $\epsilon$, which occurs at the point P1 and point P2 by the stress can be expressed by the following formula 1:

$$\varepsilon \propto \frac{\alpha TL}{H}$$

In formula 1, $\alpha$ is a coefficient of linear expansion, T is a temperature, and H is the thickness of the board 40. L is the length between the point of force and the point of action. In accordance with the position at which the stress acts, either L1 or L2 is applied.

The stress $\sigma$, which occurs at the points P1 and P2 can be expressed by the following formula 2:

$$\sigma = E\epsilon$$

In formula 2, E is a modulus of direct elasticity.

As indicated in formula 1, the strain $\epsilon$ is proportional to the length L. As indicated in formula 2, the stress $\sigma$ is proportional to the strain $\epsilon$. Accordingly, the stress $\sigma$ is also proportional to the length L.

By providing the cut part 41 with the projection portions 47 and 48, it is possible to decrease L in formula 1, and to reduce the strain $\epsilon$ and stress $\sigma$ occurring at the cut part 41. Thereby, it becomes possible to prevent such fault as occurrence of cracks in the printed wiring board 24 and breakage of soldering of the electronic components 26, and the reliability of the printed wiring board 24 is enhanced.

Next, second to sixth embodiments of the present invention will now be described with reference to the accompanying drawings. The structural parts in the second to sixth embodiments, which have the same functions as those of the portable computer 1 of the first embodiment, are denoted by like reference numerals, and a description thereof is omitted.

Figure 6:
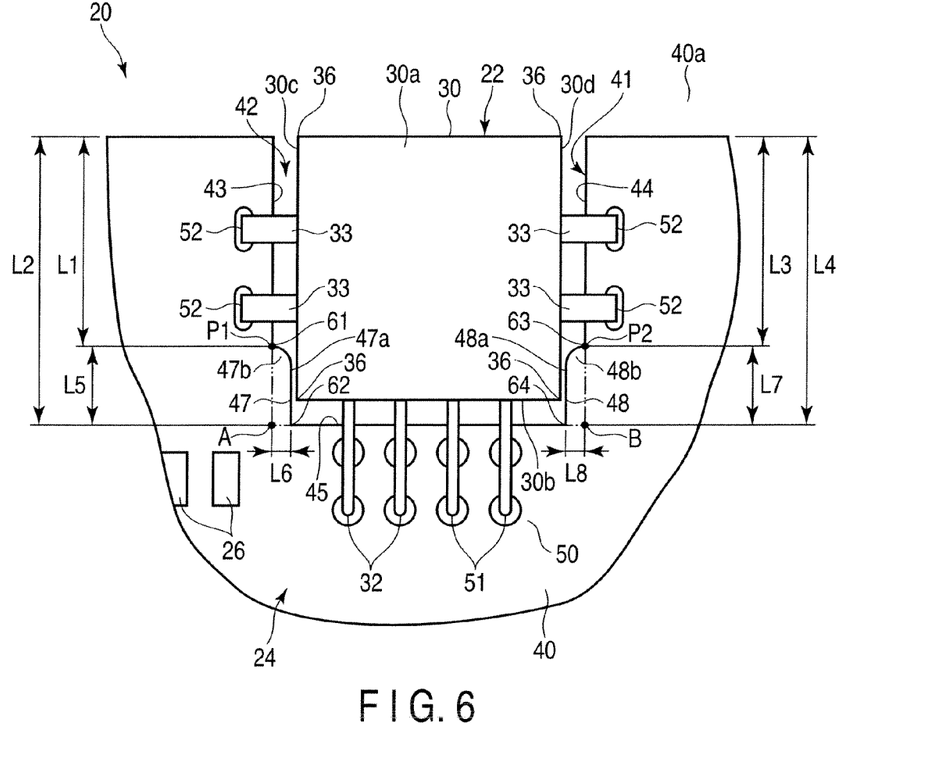
FIG. 6 is an exemplary plan view showing a part of a circuit module according to a second embodiment of the invention.

FIG. 6 shows a second embodiment of the present invention.

The projection portions 47 and 48 have protrusion portions 47b and 48b, respectively. The protrusion portion 47b is a part of the projection portion 47. The protrusion portion 47b extends along the first edge portion 43 toward the outer peripheral edge 40a of the board 40.

The protrusion portion 48b is a part of the projection portion 48. The protrusion portion 48b extends along the second edge portion 44 toward the outer peripheral edge 40a of the board 40. The protrusion portions 47b and 48b are opposed to parts of the side surfaces 30c and 30d of the USB connector 22, respectively.

The cut part 41 is further provided with a first corner portion 61 and a second corner portion 62. The first corner portion 61 is defined by the projection portion 47 and the first edge portion 43. The second corner portion 62 is defined by the projection portion 47 and the third edge portion 45.

The length L5 between the intersection point A and the first corner portion 61 is greater than the length L6 between the intersection point A and the second corner portion 62. The length L5 is less than half the length L2 between the outer peripheral edge 40a of the board 40 and the intersection point A.

The cut part 41 is provided with a third corner portion 63 and a fourth corner portion 64. The third corner portion 63 is defined by the projection portion 48 and the second edge portion 44. The fourth corner portion 64 is defined by the projection portion 48 and the third edge portion 45.

The length L7 between the intersection point B and the third corner portion 63 is greater than the length L8 between the intersection point B and the fourth corner portion 64. The length L7 is less than half the length L4 between the outer peripheral edge 40a of the board 40 and the intersection point B.

Each of the first and third corner portions 61 and 63 is an example of one corner portion. Each of the second and fourth corner portions 62 and 64 is an example of the other corner portion.

According to the second embodiment, since the projection portion 47 has the protrusion portion 47b, the length L1 between the outer peripheral edge 40a of the board 40 and the projection portion 47 becomes still less than in the first embodiment. Since the projection portion 48 has the protrusion portion 48b, the length L3 between the outer peripheral edge 40a of the board 40 and the projection portion 48 becomes still less than in the first embodiment.

Thereby, L in the above formula 1 can be made still less than in the first embodiment, and the strain ε and stress σ occurring in the cut part 41 can be reduced. Therefore, the reliability of the printed wiring board 24 can further be enhanced.

Figure 7:
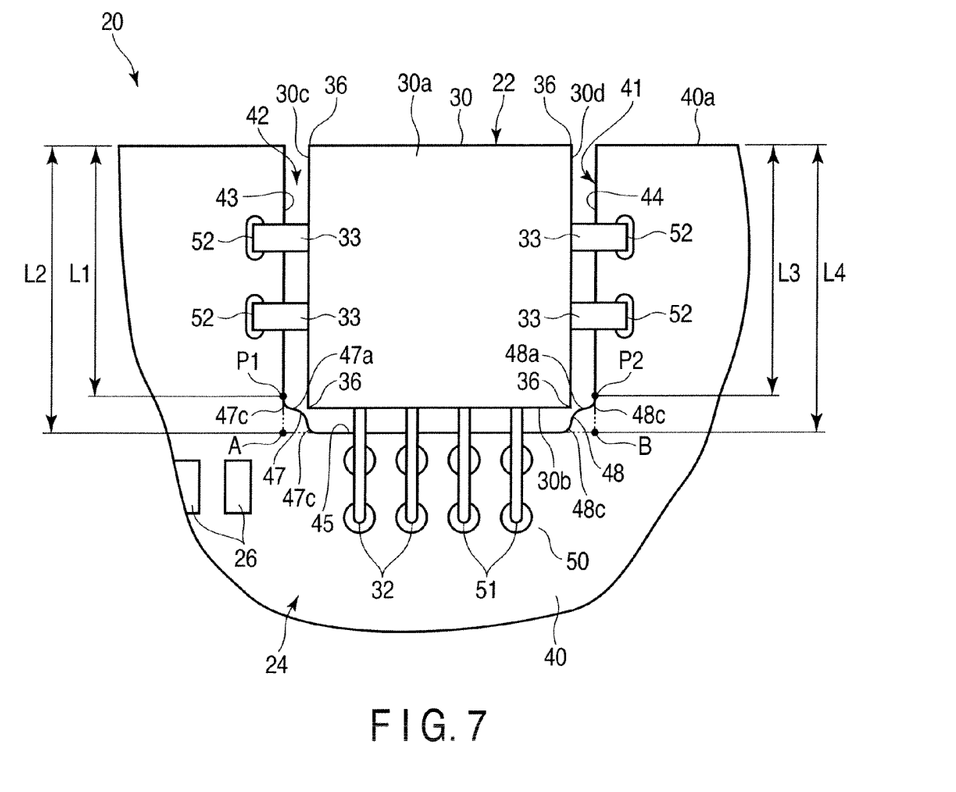
FIG. 7 is an exemplary plan view showing a part of a circuit module according to a third embodiment of the invention.

Next, a third embodiment of the invention is described with reference to FIG. 7.

The projection portion 47 includes a pair of continuous portions 47c which are gently continuous with the first and third edge portions 43 and 45. The projection portion 48 includes a pair of continuous portions 48c which are gently continuous with the second and third edge portions 44 and 45.

According to the third embodiment, the projection portion 47 is gently continuous with the first and third edge portions 43 and 45 of the cut part 41 via the continuous portions 47c. Thereby, it is possible to prevent the stress from concentrating at parts between the projection portion 47 and the first and third edge portions 43 and 45.

Furthermore, the projection portion 48 is gently continuous with the second and third edge portions 44 and 45 of the cut part 41 via the continuous portions 48c. Thereby, it is possible to prevent the stress from concentrating at parts between the projection portion 48 and the second and third edge portions 44 and 45.

Figure 8:
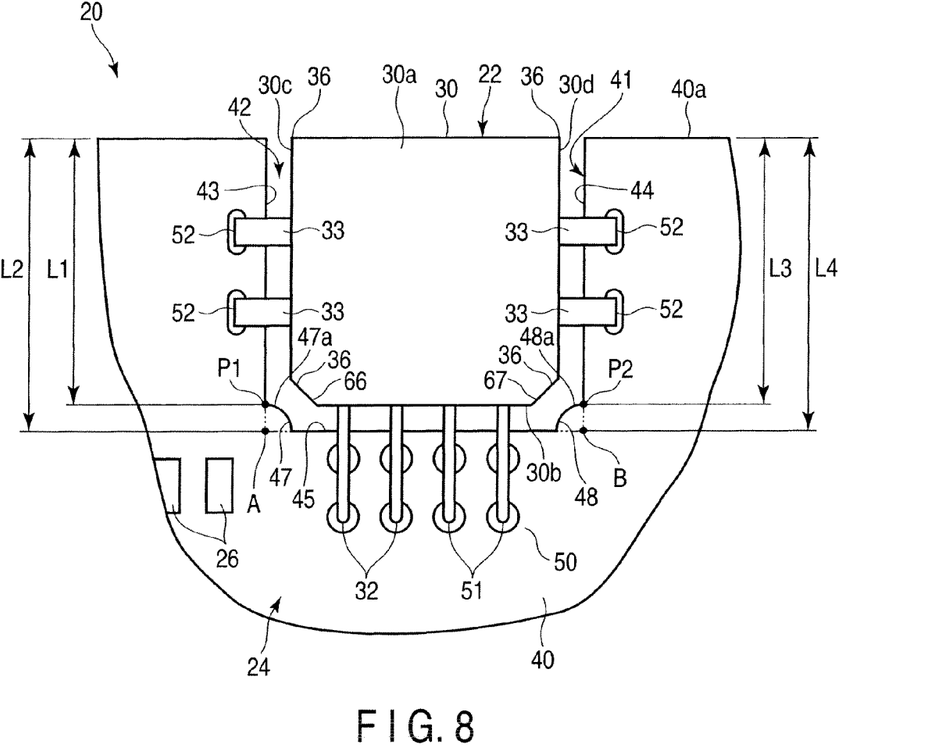
FIG. 8 is an exemplary plan view showing a part of a circuit module according to a fourth embodiment of the invention.

Next, a fourth embodiment of the invention is described with reference to FIG. 8.

The USB connector 22 has chamfer portions 66 and 67. The chamfer portion 66 is provided by chamfering the corner portion 36 at the position corresponding to the projection portion 47. The chamfer portion 67 is provided by chamfering the corner portion 36 at the position corresponding to the projection portion 48.

According to the fourth embodiment, since the USB connector 22 is provided with the chamfer portions 66 and 67, it is possible to prevent the projection portion 47, 48 from coming in contact with the USB connector 22, even in the case where the gap 42 between the USB connector 22 and the cut part 41 is small.

Thereby, the cut part 41 can be reduced in size, and the packaging density of the printed wiring board 24 can be increased. Moreover, the dimensional tolerance at the time of cutting the cut part 41 can be increased, and the manufacturing cost of the portable computer 1 can be reduced.

Figure 9:
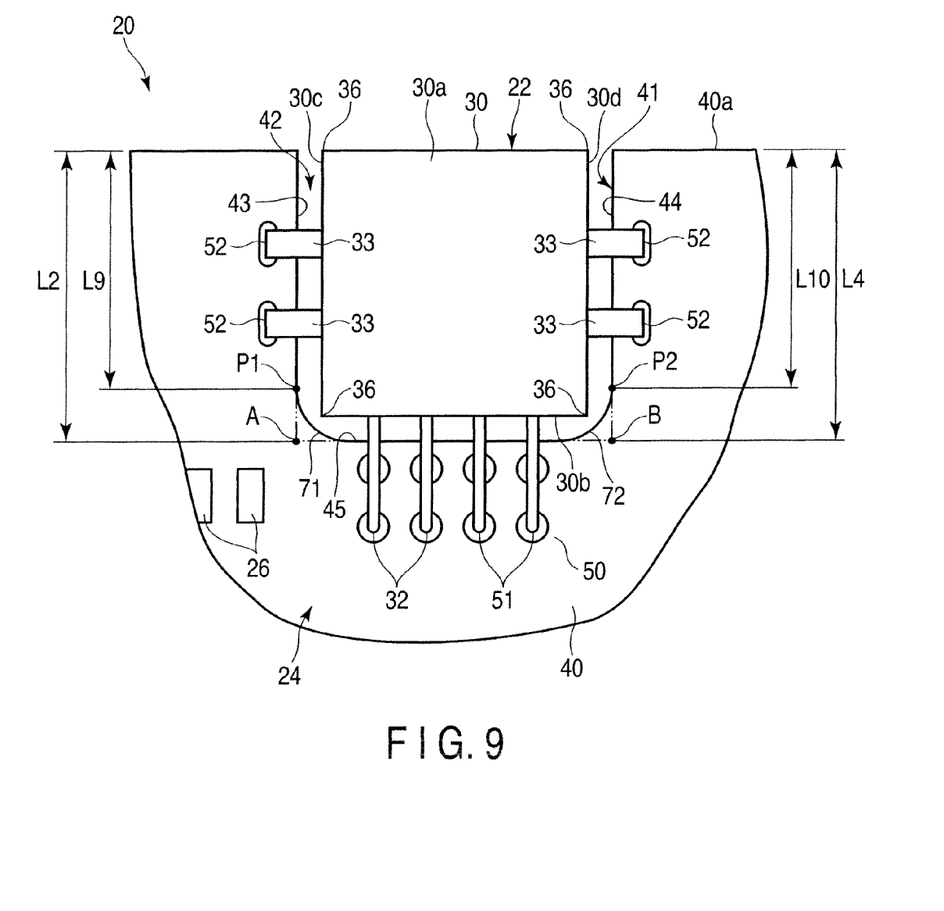
FIG. 9 is an exemplary plan view showing a part of a circuit module according to a fifth embodiment of the invention.

Next, a fifth embodiment of the invention is described with reference to FIG. 9.

The cut part 41 is provided with a curved edge portion 71 which is gently continuous with the first edge portion 43 and third edge portion 45, and a curved edge portion 72 which is gently continuous with the second edge portion 44 and third edge portion 45.

The curved edge portion 71 is provided with a bias from the intersection point A toward the corner portion 36 of the USB connector 22, which corresponds to the intersection point A. The curved edge portion 72 is provided with a bias from the intersection point B toward the corner portion 36 of the USB connector 22, which corresponds to the intersection point B.

The length L9 between the outer peripheral edge 40a of the board 40 and one end of the curved edge portion 71 is less than the length L2 between the outer peripheral edge 40a of the board 40 and the intersection point A. The length L10 between the outer peripheral edge 40a of the board 40 and one end of the curved edge portion 72 is less than the length L4 between the outer peripheral edge 40a of the board 40 and the intersection point B.

By providing the curved edge portions 71 and 72, it is possible to decrease L in formula 1, and to reduce the strain ε and stress σ occurring at the cut part 41. Thereby, the reliability of the printed wiring board 24 is enhanced.

Next, a sixth embodiment of the invention is described with reference to FIG. 10.

Figure 10:
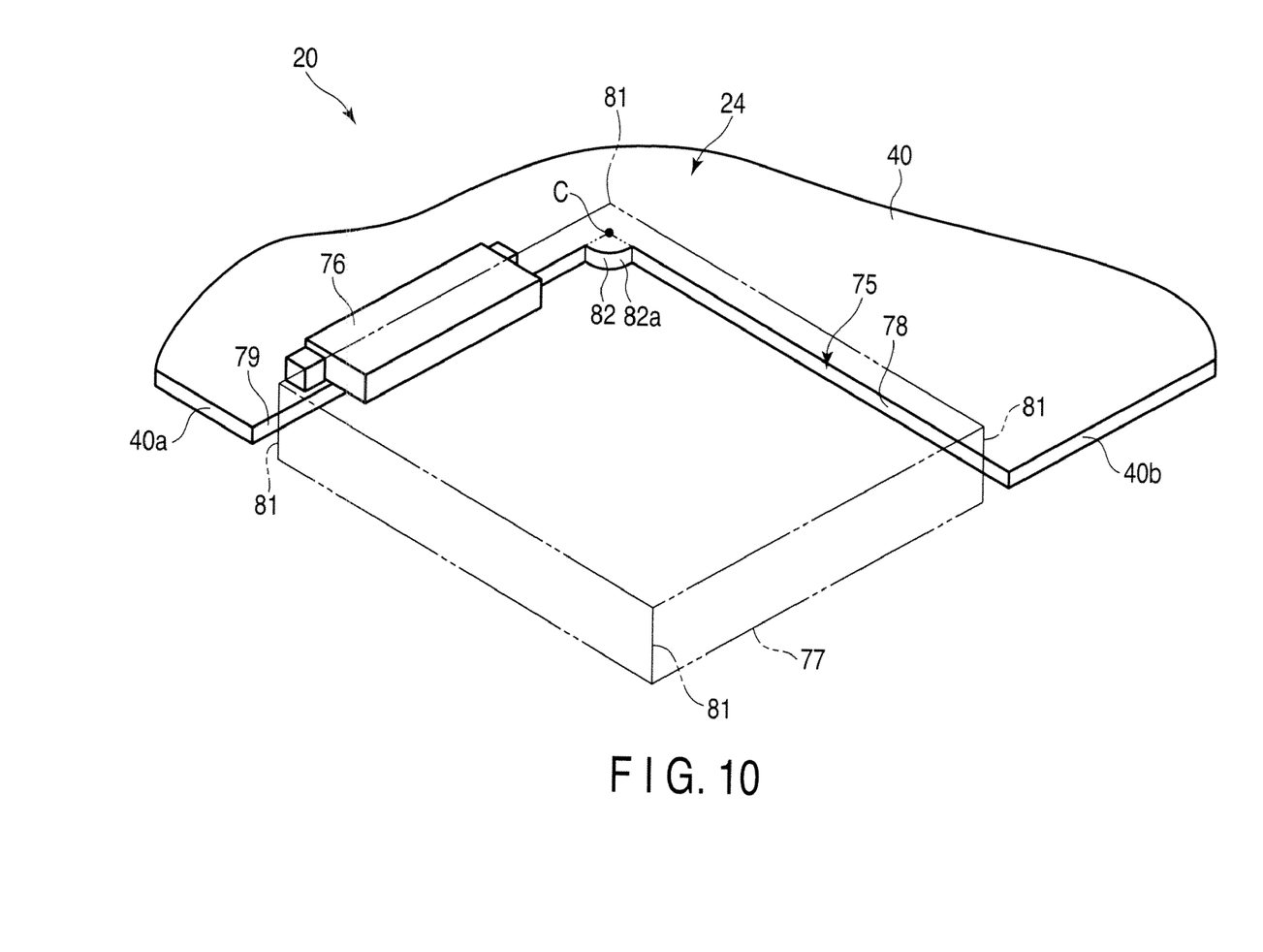
FIG. 10 is an exemplary perspective view showing a part of a circuit module according to a sixth embodiment of the invention.

As shown in FIG. 10, the board 40 of the printed wiring board 24 is provided with a cut part 75 which is formed by cutting a corner portion of the board 40 in a rectangular shape. The board 40 includes an IDE connector 76 and a hard disk drive (hereinafter referred to as "HDD") 77.

The cut part 75 is open to two neighboring outer peripheral edges 40a and 40b of the board 40. The cut part 75 is provided with a pair of edge portions 78 and 79 which are opposed to the outer peripheral surface of the HDD 77.

If one edge portion 78 and the other edge portion 79 are extended, the edge portions 78 and 79 intersect at an intersection point C in FIG. 10. The one edge portion 78 and the other edge portion 79 are located inside the outer peripheral edges 40a and 40b. The IDE connector 76 is mounted on the other edge portion 79.

The HDD 77 is disposed inside the cut part 75, and is electrically connected to the printed wiring board 24 via the IDE connector 76. The HDD 77 is an example of the circuit components and has four corner portions 81 at the outer peripheral surface thereof.

The board 40 includes a projection portion 82 which projects from the intersection point C toward the corresponding corner portion 81 of the HDD 77. The projection portion 82 is formed to span between one end of the one edge portion 78 and one end of the other edge portion 79, and has a peripheral edge portion 82a which curves in an arc about the intersection point C. In other words, the projection portion 82 is located between the one edge portion 78 and the other edge portion 79.

As has been described above, also in the case where the projection portion 82 is provided on the cut part 75 which is formed by cutting the corner portion of the board 40 in the rectangular shape, the portable computer 1 has the same advantageous effects as in the first embodiment.

The circuit components are not limited to the USB connector and HDD, and may be, for instance, an IEEE1394 connector and an RGB connector.

Besides, the shape of the peripheral edge portion 47a, 48a, 82a of the projection portion 47, 48, 82 is not limited to the arcuate shape with the center being set at the intersection point A, B, C. This shape may be, for example, an arcuate shape with the center being set at a position other than the intersection point A, B, C, or a rectangular shape, or a shape having a plurality of corner portions.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a housing;
   a printed wiring board accommodated in the housing; and
   a circuit component electrically connected to the printed wiring board, the circuit component including an outer peripheral surface,
   wherein the printed wiring board includes:
      an outer peripheral edge,
      at least a pair of edge portions, the pair of edge portions being opposed to the outer peripheral surface of the circuit component and being located inside the outer peripheral edge,
      a projection portion located between the pair of edge portions and projecting toward the circuit component,
      one corner portion which is defined by one of the edge portions and the projection portion,
      an other corner portion which is defined by the other edge portion and the projection portion,
      a length between an intersection point of the pair of edge portions made by extension thereof and the one corner portion is longer than a length between the intersection point and the other corner portion, and
      a distance between the outer peripheral surface of the circuit component and the projection portion is less than a distance between the outer peripheral surface of the circuit component and any of the edge portions.

2. The electronic apparatus of claim 1, wherein the length between the intersection point at which of the pair of edge portions, when extended, intersect and the one corner portion is less made by extension thereof and the one corner portion is shorter than a length between the outer peripheral edge of the printed wiring board and the intersection point.

3. The electronic apparatus of claim 1, wherein the projection portion is at least partially convex in shape.

4. The electronic apparatus of claim 1, wherein the projection portion is curved toward the outer peripheral surface of the circuit component.

5. An electronic apparatus comprising:
   a housing;
   a printed wiring board accommodated in the housing; and
   a circuit component electrically connected to the printed wiring board, the circuit component including a side edge,
   wherein the printed wiring board includes:
      an outer peripheral edge,
      one edge portion being opposed to the side edge of the circuit component and being located inside the outer peripheral edge,
      an other edge portion being located inside the outer peripheral edge and extending in a direction crossing the one edge portion, and
      a projection portion including a protrusion portion located between the one edge portion and the other edge portion, the protrusion portion projecting toward the circuit component so that a distance between the protrusion portion and the side edge of the circuit component is less than a distance between the one edge portion and the side edge of the circuit component, the protrusion portion extending toward the outer peripheral edge of the printed wiring board along the one edge portion and being opposed to the side edge of the circuit component.

6. The electronic apparatus of claim 5, wherein the projection portion is at least partially convex in shape.

7. The electronic apparatus of claim 5, wherein the projection portion is curved toward the outer peripheral surface of the circuit component.

* * * * *